United States Patent
Hedman et al.

(10) Patent No.: US 8,087,323 B2
(45) Date of Patent: Jan. 3, 2012

(54) GEAR TRANSMISSION WITH REDUCED TRANSMISSION WALL HOUSING DEFLECTION

(75) Inventors: Anders Hedman, Marstrand (SE); Lars Zettergren, Myggenäs (SE)

(73) Assignee: Volvo Lastvagnar AB, Göteborg (SE)

( * ) Notice: Subject to any disclaimer, the term of this patent is extended or adjusted under 35 U.S.C. 154(b) by 383 days.

(21) Appl. No.: 12/297,456

(22) PCT Filed: May 17, 2006

(86) PCT No.: PCT/SE2006/000571
§ 371 (c)(1),
(2), (4) Date: Oct. 17, 2008

(87) PCT Pub. No.: WO2007/133131
PCT Pub. Date: Nov. 22, 2007

(65) Prior Publication Data
US 2009/0100966 A1    Apr. 23, 2009

(51) Int. Cl.
  *F16H 57/02* (2006.01)
(52) U.S. Cl. .................................................. 74/606 R
(58) Field of Classification Search .............. 74/412 R, 74/413, 431, 606 R
See application file for complete search history.

(56) References Cited

U.S. PATENT DOCUMENTS

| | | | | |
|---|---|---|---|---|
| 1,971,968 A | * | 8/1934 | Schmitter | 74/421 A |
| 3,154,963 A | * | 11/1964 | Caley et al. | 74/421 R |
| 3,430,523 A | | 3/1969 | Merritt | |
| 5,188,572 A | | 2/1993 | Yamaguchi et al. | |
| 5,433,672 A | | 7/1995 | Tanaka et al. | |
| 5,787,766 A | * | 8/1998 | Blach | 74/665 G |
| 6,601,467 B1 | * | 8/2003 | Futterer | 74/421 A |

FOREIGN PATENT DOCUMENTS

| | | |
|---|---|---|
| EP | 0507084 B1 | 10/1992 |
| WO | 2005121604 A1 | 12/2005 |

OTHER PUBLICATIONS

International Search Report for corresponding International Application PCT/SE2006/000571.
International Preliminary Report on Patentability for corresponding International Application PCT/SE2006/000571.

\* cited by examiner

*Primary Examiner* — Vicky Johnson
(74) *Attorney, Agent, or Firm* — WRB-IP LLP

(57) ABSTRACT

A gear transmission is provided including at least a first and a second shaft with substantially fixed and substantially parallel axes of rotation, a transmission housing with a first and a second wall that extends perpendicular to the axes of rotation, and a plurality of gearwheels that are rotationally fixed or rotationally fixable to the shafts. The shafts include at least one input shaft and at least one output shaft, the shafts being suspended by bearings that are seated in the first and second walls. The first wall is connected to the second wall with at least one rod in order to reduce deflections in operation of the first and second walls.

12 Claims, 3 Drawing Sheets

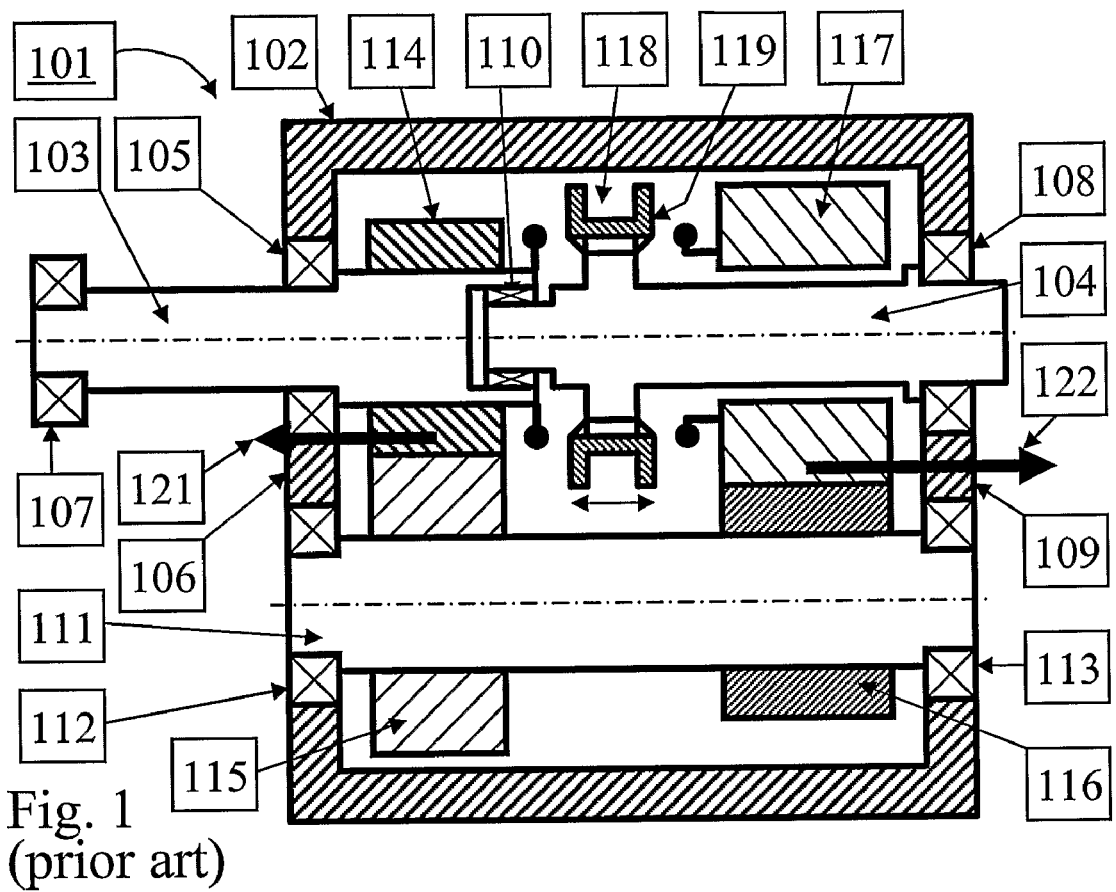
Fig. 1 (prior art)
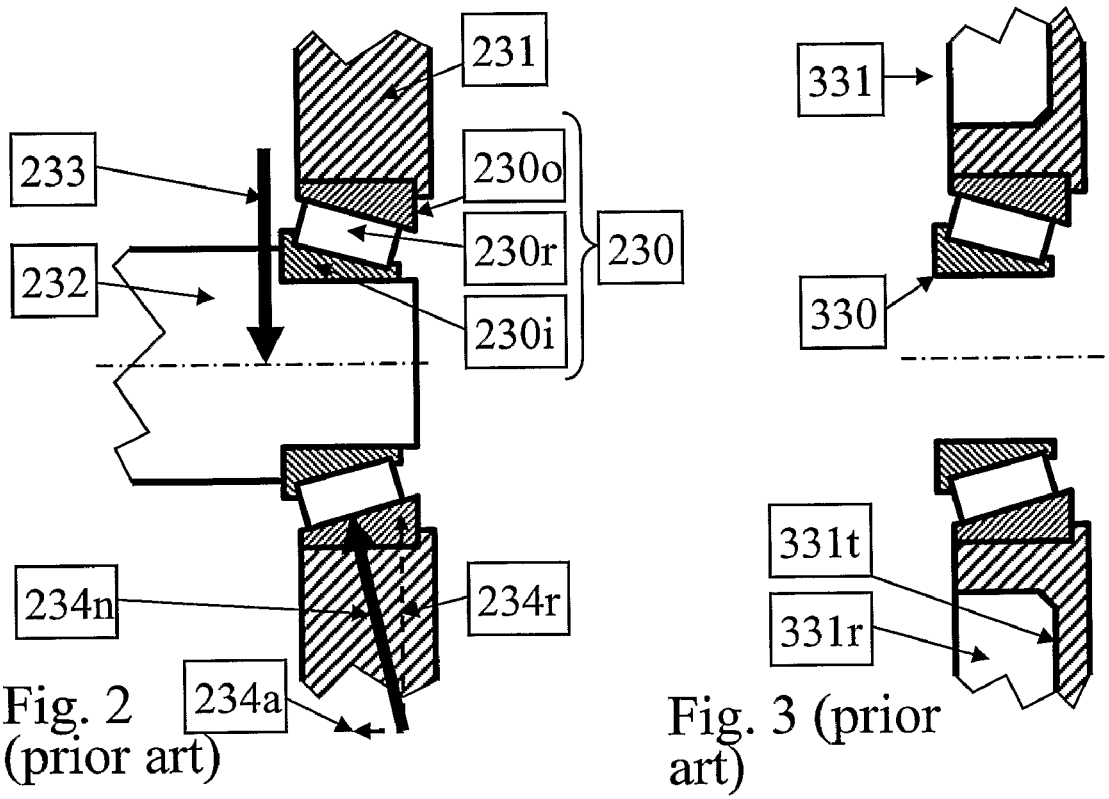
Fig. 2 (prior art)
Fig. 3 (prior art)

GEAR TRANSMISSION WITH REDUCED TRANSMISSION WALL HOUSING DEFLECTION

BACKGROUND AND SUMMARY

The present invention relates to gear transmissions, and more particularly to a system for decreased deflection of transmission housing walls that are subjected to bearing loads.

Fix-axes gear transmissions are used in many fields of technology, for instance in vehicles in manually shifted or automated form. They comprise a number of gearwheels that are located on a number of shafts. The shafts are supported by bearings that are seated in a transmission housing. The rotational axes of the shafts are thereby substantially fixed, hence the designation fix-axes gear transmissions. When torque is transferred from one gearwheel to another, significant gear mesh forces arise. These gear mesh forces will create reaction forces in the bearings. Thereby, in operation the walls of the transmission housings will be subjected to forces that will tend to deflect the walls. For proper function and life of the gearwheels and bearings, it is important that these deflections are limited.

In order to reduce weight, there is a trend towards using light alloys rather than iron based alloys for the transmission housings. Due to lower inherent stiffness of conventional light alloys, the deflections of the housing walls will increase. Furthermore, cost-efficient casting methods for light alloys do not permit as large wall thickness as is common in cast iron housings. That will further increase the deflections in light-alloy housings. Finally, the significantly larger thermal expansion of light alloys compared to steel will cause increased axial clearance in the bearings at operating temperature, which will give reduced bearing life.

There are some known ways to reduce the increased deflections of the walls of transmission housings made of light alloys. Firstly, reinforcing ribs will increase the stiffness of the walls while maintaining a small wall thickness. This can be seen in DE-10027375 and DE-10316321. That will, however, in general not give stiffness equal to that of a wall of full thickness unless the ribs are very large, which implies increased length of the transmission. Another way is to have a curved or bell-like shape of the wall instead of a more conventional flat wall. That will, unfortunately, also result in increased transmission length.

It is desirable to decrease deflection in the walls of a transmission housing.

So, there is a need for a way to increase the stiffness of fix-axes gear transmission housing walls but without the disadvantages regarding length, weight, and casting ability of prior art. According to an aspect of the present invention, a design is provided with a number of substantially straight rods connected between the housing walls where the bearings that support the shafts are seated. Thereby, the axial deflections of these housing walls will be reduced significantly.

Moreover, the corresponding misalignment of the bearing seats will be reduced, too. That will increase the bearing life.

In a preferred embodiment, the housing is made of light alloy. The rods will then compensate for the lower inherent stiffness (modulus of elasticity) of the light alloy.

In a further preferred embodiment, the rods are made of steel or any other material with lower thermal expansion than the housing material. Then, it is possible to counteract the thermal expansion, from ambient to operating temperature, of the housing relative to the shafts.

In yet a further preferred embodiment, the rods are preloaded at the assembly. When made of steel (or any other material that has a lower thermal expansion than the material of the housings), the rods will then also at temperatures lower than room temperature be able to reduce the axial deflection of the housing walls.

In an additional preferred embodiment, rods are located radially close to the intersections, when seen in axial direction, of the diametrically largest rotating parts of the shafts. Thereby, the rods will be close to the parts of the housing walls that would have the largest deflections if there were no rods. That will give a large reduction of the deflections.

In another preferred embodiment of the invention, the rods are screws that have a head in one end and threads in the other end. That will facilitate the assembly, especially if the rods are to be preloaded. Furthermore, if one of the housing walls to be connected by the rods is designed to have lubricating liquid on one side only, the threaded end of the screws can be mounted in a tapered boss in that wall. Thereby, possible risks for lubricating liquid leakage can be eliminated.

In still another preferred embodiment, the transmission is at least a part of a vehicle transmission for a heavy road vehicle, such as a truck or a bus. In such a transmission, the loads are very high. Thus, rods according to the invention will be of great advantage, especially if the transmission is the main section of a compound (or range) type vehicle transmission, for instance as shown in FIGS. 1, 3 and 5 in EP-1476681. There, rods as long screws can be mounted with the head against the housing wall between the main section and the compound (or range) section. There will be lubricating liquid on both sides of that wall. Thus, a possible lubricating liquid leakage around the screw heads would be irrelevant. The other end of the screws can then be mounted in tapered bosses in the opposite housing wall that faces the clutch. This will prevent leakage of lubricating liquid.

Finally, in a preferred embodiment, at least one rod is mounted inside a hollow shaft. Thereby, the rod will act very close to the bearings that support the hollow shaft.

BRIEF DESCRIPTION OF THE DRAWINGS

The present invention will be described in greater detail below with reference to accompanying drawings which, for the purpose of exemplification, shows further preferred embodiments of the invention and also the technical background.

FIG. 1 shows a schematic longitudinal section of a typical fix-axes gear transmission according to prior art.

FIG. 2 shows forces in a typical conventional taper roller bearing according to prior art.

FIG. 3 shows a taper roller bearing seated in a transmission housing wall with small wall thickness and reinforcing ribs according to prior art.

DETAILED DESCRIPTION

Figure 4:
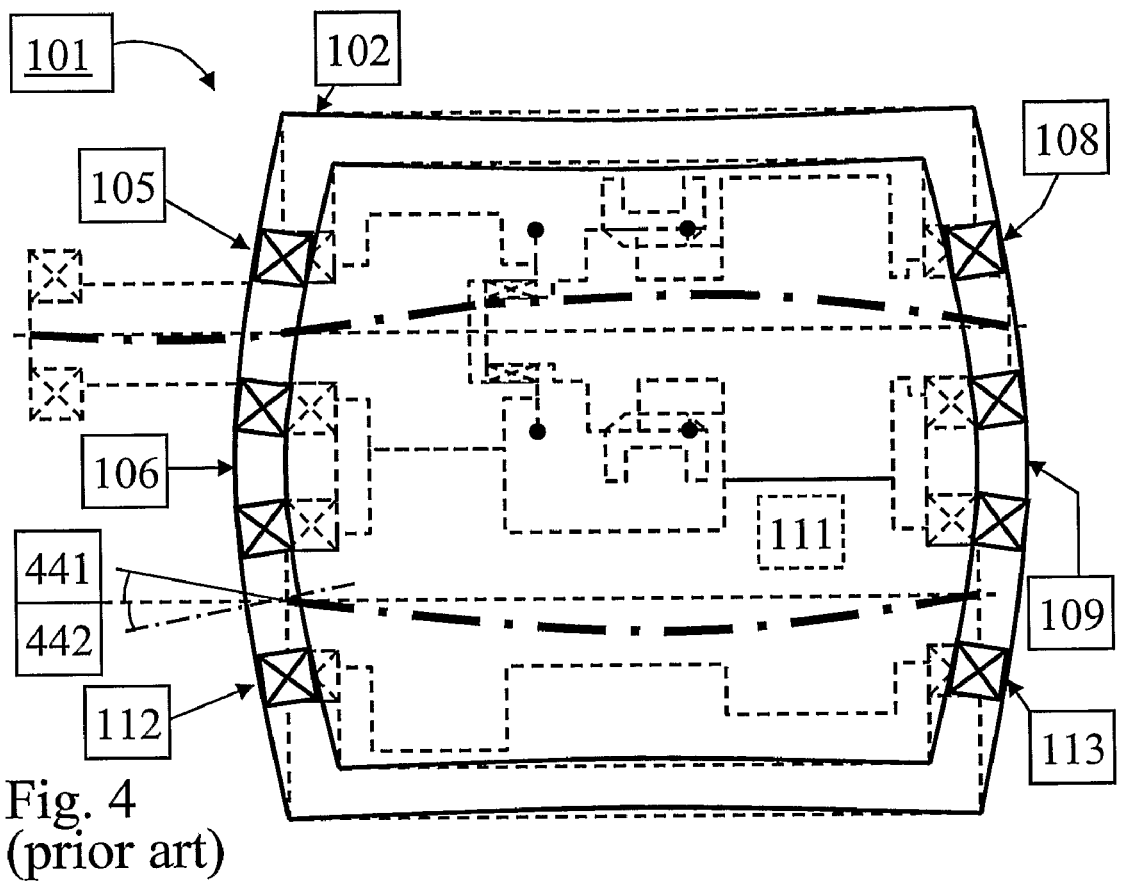
FIG. 4 shows deflections of housing walls and shafts of the transmission of FIG. 1.

FIG. 1 shows a simplified longitudinal section of a fix-axes gear transmission 101 with a transmission housing 102, input shaft 103 and output shaft 104. The transmission housing 102 is here shown as a one-piece unit, but it could also have been composed of two or more housing parts. The input shaft 103 is supported by an input shaft bearing 105, which is seated in a front wall 106 of the transmission housing 102, and by a flywheel pilot bearing 107, which is seated in a prime mover output shaft (not shown). Similarly, the output shaft 104 is supported by an output shaft bearing 108 that is seated in a rear wall 109 of the transmission housing 102. The input shaft 103 is substantially coaxial with the output shaft 104. A second point of support for the output shaft 104 is a pilot bearing 110 that is carried by the input shaft 103. Furthermore, there is a countershaft 111 located radially apart from the input shaft 103 and the output shaft 104. The countershaft 111 is supported by a front countershaft bearing 112, which is seated in the front wall 106, and a rear countershaft bearing 113, which is seated in the rear wall 109. An input shaft primary gearwheel 114 is fixedly connected to the input shaft 103. The input shaft primary gearwheel 114 is in mesh with a countershaft primary gearwheel 115 that is fixedly connected to the countershaft 111. A countershaft secondary gearwheel 116 is also fixedly connected to the countershaft 111. The countershaft secondary gearwheel 116 is in mesh with a floating gearwheel 117 that is rotationally supported on the output shaft 104. A tooth clutch 118 can rotationally connect the output shaft 104 to either the floating gearwheel 117 or to the input shaft 103 when an engaging sleeve 119 is moved to the right or to the left, respectively. Thereby, two speed ratios can be obtained. When the floating gearwheel 117 is rotationally connected to the output shaft 104, a reduction gear is obtained where the output shaft 104 rotates slower than the input shaft 103. When the input shaft 103 and the output shaft 104 are rotationally connected, their speeds will be equal and a direct gear is obtained.

When torque is being transferred in the reduction gear, gear mesh forces will occur between the meshing teeth of the gearwheels 114, 115, 116 and 117. In the bearings, these gear mesh forces will cause reaction forces that will be carried by the walls of the transmission housing 102. In fix-axes gear transmissions, taper roller bearings are often used to support the shafts. This type of bearing offers high load capacity and long life to a competitive cost.

FIG. 2 shows a taper roller bearing 230 with inner ring 230i, rollers 230r and outer ring 230o. The taper roller bearing 230 is seated in a transmission housing wall 231 and supports a shaft 232. A radial force 233 is transferred by the taper roller bearing 230 from the shaft 232 to the transmission housing wall 231. In a taper roller bearing, a radial force always corresponds to an axial force. Hence, the radial force 233 will be transferred between the rollers 230r and the outer ring 230o as a normal load 234n that has a radial component 234r and an axial component 234a.

In order to reduce noise, helical gearing is normally used. Thereby, axial components of the gear mesh forces will arise. When using taper roller bearings in a fix-axes gear transmission like the one in FIG. 1, it is usually necessary to spare the pilot bearing 110 from high axial forces. This is solved by selecting hands of helix in such a way that the axial gear mesh force components that act on the gearwheels on the input shaft 103 and the output shaft 104 are not directed towards the pilot bearing 110. That is indicated by the primary axial gear mesh component 121 and the secondary axial gear mesh component 122. Thereby, there will be no external axial forces in the pilot bearing 110. On the other hand, there will be additional axial forces acting on the bearings 105 and 108. That will increase the housing wall deflections.

Thus, with taper roller bearings, gear mesh forces will create axial forces that act on the transmission housing walls in which the bearings are seated. These axial forces will deflect the housing walls. The stiffer the housing walls are, the lower that deflection will be. The transmission housing wall 231 in FIG. 2 has a thickness that is about as large as the width of the bearing 230.

FIG. 3 shows a similar bearing 330 that is seated in a die-cast transmission housing wall 331. Die-casting processes do in general not allow very large wall thickness. So, the transmission housing wall 331 has been designed with a thin part 331t and reinforcing ribs 331r. Still, the transmission housing wall 331 will not be as stiff as the corresponding transmission housing wall 231 in FIG. 2, unless the reinforcing ribs 331r are significantly higher than the width of the bearing 330. An alternative solution would be to stiffen the transmission housing wall 331 by making it curved or dome-shaped. Both these solutions would, however, cause an undesired increase in length of the transmission. Furthermore, light alloys, such as aluminium, have a lower stiffness, modulus of elasticity, than cast iron. Hence, a die-cast light-alloy housing wall (331) will be less stiff than a cast-iron solid wall (231).

FIG. 4 shows in a simplified and exaggerated way the deflections in operation of the shafts and transmission housing walls of the fix-axes gear transmission of FIG. 1. The thick dash-dotted lines indicate the deflections of the shafts. For instance, for the front countershaft bearing 112 it can be seen that the deflections of both the countershaft 111 and the front wall 106 will contribute to the misalignment. The total misalignment of the front countershaft bearing 112 is the sum of the countershaft misalignment 441 and front wall misalignment 442. Moreover, the axial deflections of the rear wall 109 and the front wall 106 will give increased axial clearance for at least some of the bearings 105, 108, 110, 112 and 113. Misalignment and axial clearance both have a negative impact on the life of the bearings.

Figures 5, 6:
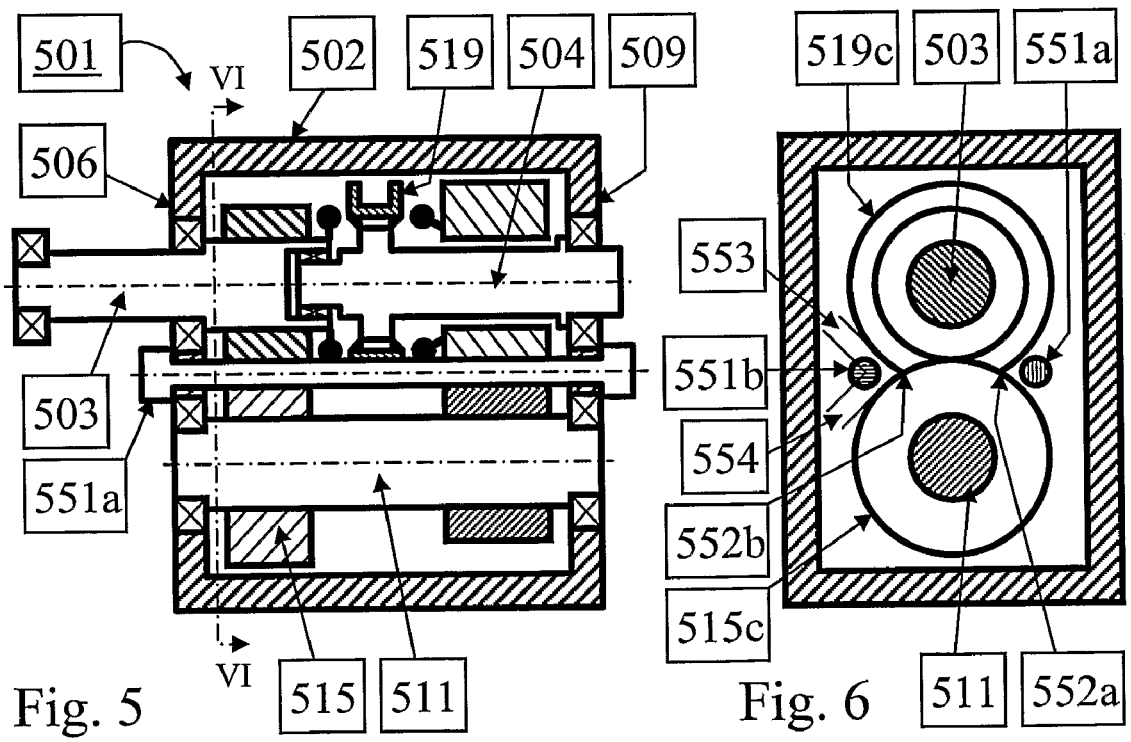
FIG. 5 shows, according to the invention, a rod that connects the housing walls that carry bearings in a modified variant of the transmission of FIG. 1.
FIG. 6 shows an axial view of a fix-axes gear transmission with rods according to the invention located close to the intersections of the tip circles of the diametrically largest rotating parts of the shafts.

FIG. 5 shows a longitudinal section of a modified variant according to the invention of the fix-axes gear transmission 101. There are two additional rods 551a and 551b (not visible) that connect the front wall 506 and the rear wall 509 of the transmission housing 502. A straight rod is very stiff in axial direction compared to a conventional transmission housing. Thus, the axial deflections of the front wall 506 and the rear wall 509 can be counteracted very efficiently by the rods 551a and 551b. Then, if the rods 551a and 551b are made of a material with a lower thermal expansion coefficient than the material of the transmission housing 502, increased axial clearance in the bearings at operating temperature will be counteracted, too.

Furthermore, if these rods are preloaded at the assembly, that preload will be reduced at low temperatures. That will spare the bearings at a startup at sub-zero temperatures.

Ideally, for the best counteraction of the housing deflections, the rods 551a and 551b should be located right between the shafts of the transmission. That would, however, lead to major interference with gearwheels and other rotating parts. Instead, the rods can be located as close as possible to that idealized position. FIG. 6 shows an axial view of the fixed axes gear transmission 501 of FIG. 5. The rods 551a and 551b are located close to the intersections 552a and 552b of the tip circle 515c of the largest rotating part of the countershaft 511 and the tip circle 519*c* of the largest rotating part on the coaxial input shaft 503 and output shaft 504. Preferably, the distances 553 and 554 from the centre of a rod to these tip circles should both be less than the diameter of the rod. If the rod would not be of circular cross section, the largest extension in lateral direction could be used instead of the diameter.

Figure 7:
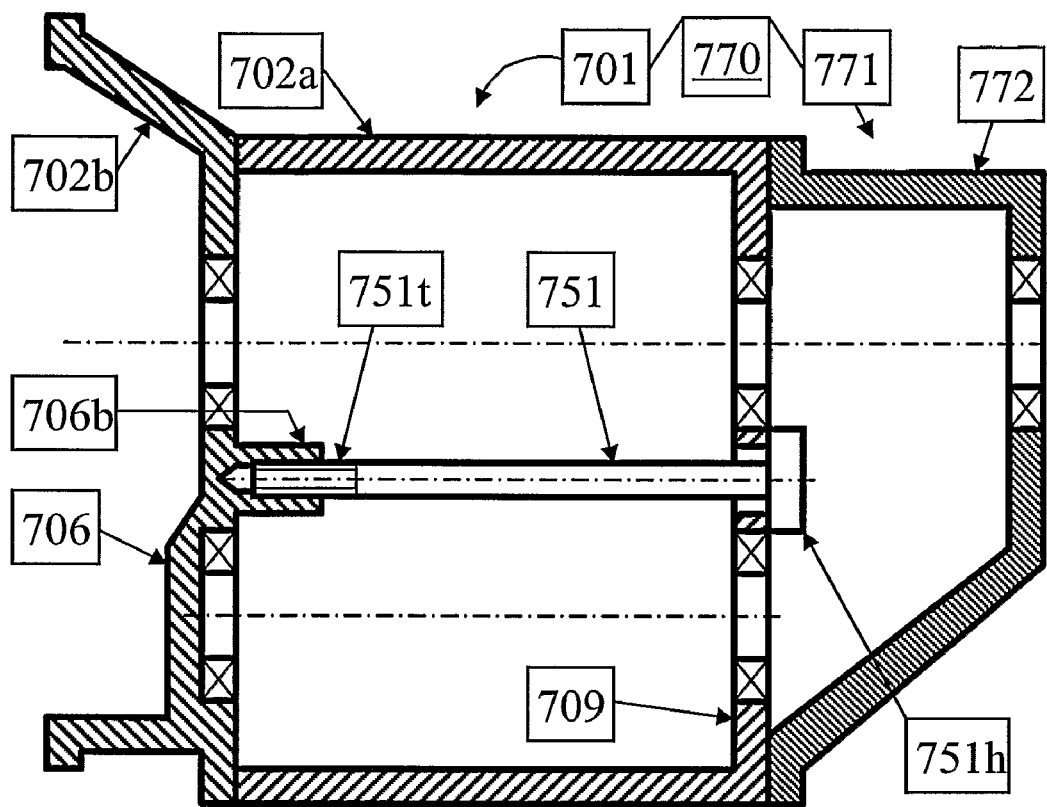
FIG. 7 shows a rod according to the invention embodied as a long screw.

In heavy road vehicles, such as heavy trucks and buses, transmissions of compound type are often used. In a compound transmission, a fix-axis gear transmission, the main section, is connected in series with a compound section. The gears in the main section can be combined with the gears in the compound section, giving a large number of gears in total. Some examples are shown in EP-1476681. In general, the main and compound sections are integrated in such a way that the rear housing wall (corresponding to 109 in FIG. 1) of the main section is also the front housing wall of the compound section. FIG. 7 shows a simplified longitudinal section of a compound transmission 770 that is composed of a fix-axes gear transmission 701 as main section and a compound section 771. For clarity, the rotating parts, such as shafts, clutches and gearwheels, have been left out. The main section 701 has a main housing 702*a* and a clutch housing 702*b*. The compound section 771 has a compound housing 772. There will be lubricating liquid (preferably oil) on both sides of the main housing rear wall 709. A possible lubricating liquid leakage through that wall will be harmless. On the other hand, the wall 706 of the clutch housing 702*b* has lubricating liquid on the side that faces the internals of the main section 701. A possible lubricating liquid leakage to the other side, where a dry plate clutch (not shown) is located, would be disastrous. Therefore, the rod 751 according to the invention is embodied as a long screw with threads 751.*t* in one end and a head 751*h* in the other end. The threaded end 751*t* is mounted in a boss 706*b* with mating threads in the clutch housing wall 706. The head 751*h* is seated against the main housing wall 709 in the compound section 771. With the screw rod 751 and the boss 706*b*, oil leakage to the dry plate clutch is prevented. Furthermore, the assembly is facilitated and it would be straightforward to apply a preload.

Figure 8:
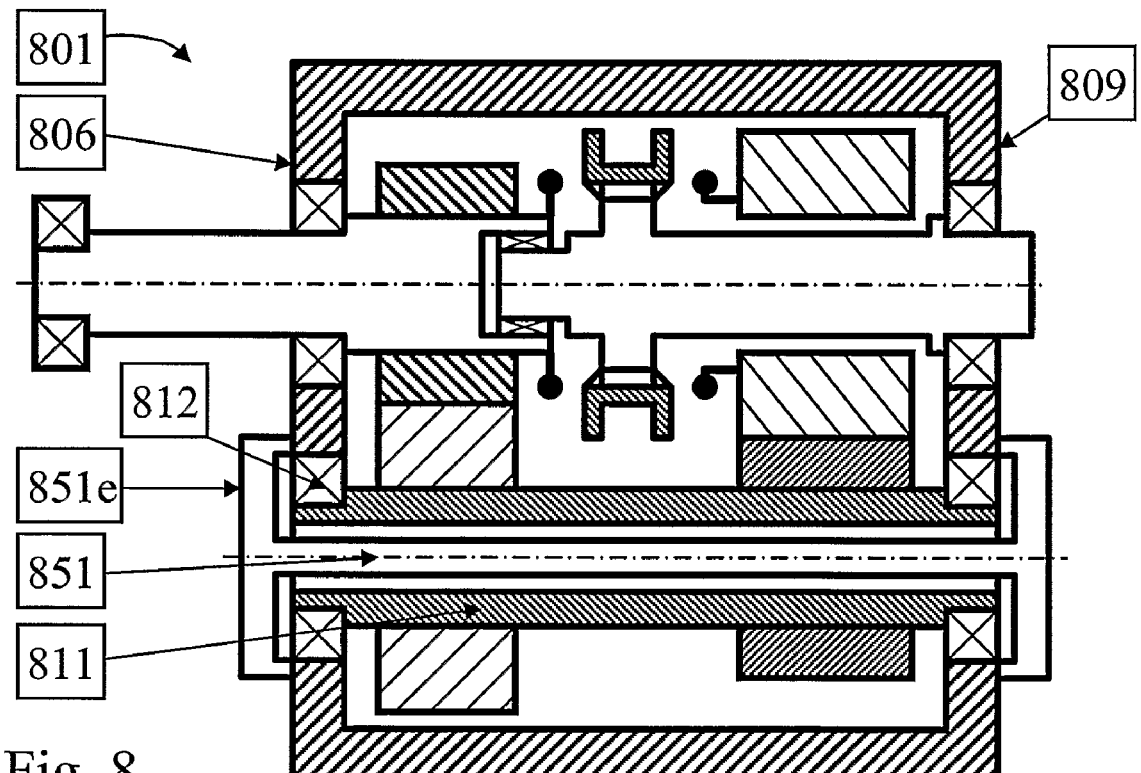
FIG. 8 shows a rod according to the invention mounted inside a hollow shaft.

FIG. 8 shows a longitudinal section of a modified variant according to the invention of the fix-axes gear transmission 101. There is a rod 851 located inside a hollow countershaft 811. With that location, the deflections of the housing walls 806 and 809 can be counteracted in a very efficient way. A rod end 851*e* could be formed as a cover and serve as a cover for a countershaft bearing 812.

In an alternative embodiment the input shaft is not coaxial with the output shaft. Thus, the output shaft could be arranged in parallel to both the input shaft and the countershaft.

The invention should not be deemed to be limited to the embodiments described above, but rather a number of further variants and modifications are conceivable within the scope of the following patent claims.

The invention claimed is:

1. Gear transmission comprising at least a first and a second shaft with substantially fixed and substantially parallel axes of rotation, the first shaft being not substantially coaxial with the second shaft, a transmission housing with a first and a second wall that extend substantially perpendicular to the axes of rotation, and a plurality of gearwheels that are rotationally fixed or rotationally fixable to the shafts, the shafts comprising at least one input shaft and at least one output shaft, the shafts being suspended by bearings that are seated in the first and second walls, the first wall being connected to the second wall with at least one rod, wherein distances between the geometrical center of a cross-section of the at least one rod and each tip circle of the gearwheels are less than a largest lateral extension of the cross-section of the at least one rod.

2. Gear transmission as in claim 1, wherein at least one of the at least one rod is substantially parallel to the axes of the shafts.

3. Gear transmission as in claim 1, wherein the housing is made of aluminium- or magnesium-based light alloy.

4. Gear transmission as in claim 1, wherein the at least one rod is made of a material that has a lower thermal expansion coefficient than the material of the housing.

5. Gear transmission as in claim 1, wherein the at least one rod is made of steel.

6. Gear transmission as in claim 1, wherein the at least one rod is preloaded at the assembly.

7. Gear transmission as in claim 1, wherein the at least one rod is a screw with an end having threads and the other end having a head.

8. Gear transmission as in claim 7, wherein the head is disposed against the second wall with lubricating liquid on both sides of the second wall, and that the end is mounted in a boss, which is arranged on the first wall with lubricating liquid only on one side of the first wall.

9. Gear transmission as in claim 8, wherein the gear transmission is a main section of a compound transmission, comprising at least the main section and a compound section connected in series and that the first wall is a clutch housing wall and the second wall is a main housing wall.

10. Gear transmission as in claim 1, wherein one of the at least two shafts is hollow and that one of the at least one rod is located inside the hollow shaft.

11. Gear transmission as in claim 10, wherein at least one end of the rod is formed as and serves as a cover for a bearing of the hollow shaft.

12. Gear transmission as in claim 1, wherein a head is arranged in each end of the at least one rod.

* * * * *